Dec. 26, 1967   O. A. L. JEAN   3,359,707
METHOD AND APPARATUS FOR REMOVING $CO_2$ AND MOISTURE FROM STALE AIR
Filed Jan. 21, 1964   3 Sheets-Sheet 1

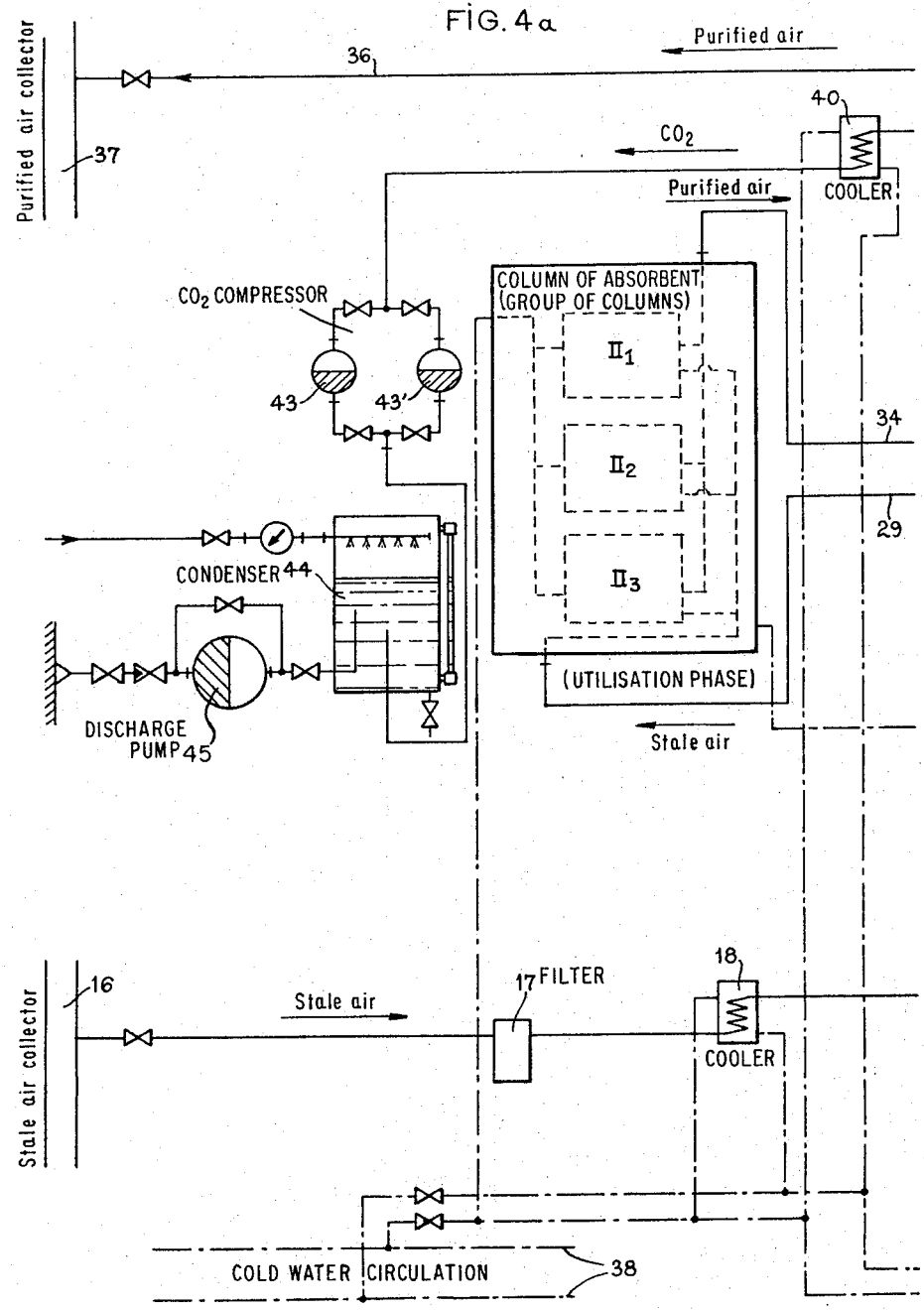

United States Patent Office 3,359,707
Patented Dec. 26, 1967

3,359,707
METHOD AND APPARATUS FOR REMOVING $CO_2$ AND MOISTURE FROM STALE AIR
Olivier Auguste Louis Jean, 39 Route de Malagnou, Geneva, Switzerland
Filed Jan. 21, 1964, Ser. No. 339,268
22 Claims. (Cl. 55—33)

This invention relates to a process and apparatus for purifying stale air such as that occurring in unventilated places, especially underground shelters and submarines, and in general for eliminating gases and vapours from a confined atmosphere.

In the purification or regeneration of stale air, adsorbent substances which take up the carbon dioxide contained in the stale air are generally used. Such substances include monoethanolamine, the use of which, however, is not very convenient since it is a liquid through which the air to be purified must be bubbled. Solid adsorbent substances commonly used are generally based on silicates, especially double silicates of aluminium and sodium. One of these, known under the name of "Linde molecular sieve," is particularly suitable for use in the method according to the present invention. Of course, all adsorbents have a limited adsorption capacity for water vapor and carbon dioxide and the essential problem which arises concerns the regeneration of the adsorbents when they are saturated.

The molecular adsorption reaction is exothermic, the quantity of heat given off being dependent on the affinity of the adsorbent for the substance adsorbed and on the partial pressure of the substance adsorbed, in the case of gaseous mixtures, and these two properties are utilised in all the known processes, i.e. for regeneration of the adsorbent. Such processes include direct heating of the molecular adsorbents, but this is made extremely difficult on account of the fact that the said substances are very good heat insulators, so that when they are heated a high temperature gradient is produced. Consequently, in order to raise the adsorbed substances to a temperature sufficient to cause it to be expelled the adsorbent must be heated to very high temperatures (of the order of 400° C. in the case of water and carbon dioxide adsorbed in a molecular sieve) which are near to the temperature of change of state of the adsorbent and even greater than the said temperature in the neighbourhood of the heating element, resulting in the partial destruction of the adsorbent.

In another process of regeneration the adsorbent is heated by passing therethrough a current of hot gas, generally air. However, the hot gas becomes mixed with the adsorbed substances thus eliminated, and is, therefore, wasted. Consequently, the volume of gas or air necessary is too great to allow this process to be used in an automatic apparatus, for example, on board a submarine.

According to a third process the adsorbent is heated under vacuum which, in addition to the above-mentioned disadvantages of direct heating, necessitates the use of a vacuum pump of large capacity, thus increasing the cost, the complication and the fragility of the apparatus. Moreover, the oil used in the high vacuum pumps inevitably rises in the apparatus and finally adulterates the adsorbent.

It is an object of the invention to mitigate or overcome the above-mentioned disadvantages.

According to the invention there is provided a process for the purification of air, especially stale air, by passing the air through an adsorbent which is capable of taking up the impurities such as carbon dioxide and water vapor, this being the adsorption phase, and regenerating the adsorbent by heating it to drive off the said impurities, this being the desorption phase, wherein the heating of the adsorbent for regeneration thereof is effected by means of high frequency dielectric losses.

The method of heating used in the process according to the invention makes it possible to obtain extremely important advantages on account of the fact that the heating by dielectric losses is produced, by its very nature, in the body of the whole mass placed in the high frequency field, and the difficulties due to the heat insulating properties of the adsorbent are therefore eliminated. Moreover, the heat developed within the substance placed in the electric field is proportional to its loss angle and to its resistivity. Now it is found that the loss angle and the resistivity of the adsorbed substances (in the case of water for example), are in general considerably greater than those of the adsorbent. Consequently the electric power supplied is distributed to the advantage of the adsorbed substance, so that the efficiency of the process is very much greater than that of the usual heating processes, and the temperature to which the adsorbent is heated is much less (of the order of 150° to 200° C. instead of 400° C. in the case of the desorption of water and $CO_2$ from the above-mentioned Linde molecular sieve).

Moreover, by the use of heating by dielectric loss, a selective static desorption can be obtained if the adsorbent has a particular affinity for one of the adsorbed substances. For example, in the purification of air containing moisture and carbonic acid gas, water is the substance for which the adsorbent has the greater affinity. If we consider the Linde molecular sieve column through which air to be purified passes upwardly, the column can be divided at the end of the adsorption period into two parts, namely a lower part completely saturated with water, and an upper part completely saturated with $CO_2$. If, in accordance with the invention, the column is heated by high frequency dielectric loss, the adsorbed water, the loss angle and resistivity of which are greater than those of $CO_2$, becomes heated first and diffuses into the upper part of the column, displacing the $CO_2$ which is discharged at the top of the column, so that at the end of a given heating period, the upper part of the column will contain only moisture. In order to remove the moisture it is only necessary to pass a current of hot air through the column in closed circuit with a condenser, the current of air being previously heated to a temperature sufficient to provide the necessary air for driving off the residual water.

Another feature of the use of high frequency field functioning as a non-conductive electrostatic field, makes it possible to break down the electrical bonds between the sieve and the contaminants it has taken from the air purified thereby. The sieve is regenerated or cleaned without need of much heat or reliance on heat in driving off the absorbed contaminants.

The apparatus for carrying out the process according to the invention may comprise two adsorbent columns or two groups of adsorbent columns used alternately, that is to say for adsorption and desorption. While a column is in use for adsorption it is subjected to a strong cooling which makes it possible to increase the yield. For example, the moist air charged with $CO_2$ entering the column can be cooled to about 12° C., using a circulation of cold water through the double wall of the container. During the regeneration or desorption phase the column is subjected to heating by dielectric loss followed by passage of a current of hot air therethrough and further cooling. Owing to the improvement in rate of flow and owing to the acceleration of the regeneration it is only necessary to use two columns or two groups of columns operating alternately in the process according to the invention.

By using two groups of several columns of adsorbent arranged in series and thus increasing the ratio of the total length of the adsorbent traversed to the area of cross-section of the adsorbent the efficiency of the adsorption can be considerably improved without this advantage being offset by a resulting increase in the pressure drop. Moreover, by using several columns in series it can be arranged that only the last column contains adsorbed $CO_2$ at the end of the adsorption period, the preceding columns being saturated with moisture, so that only the last column requires the application of heat by dielectric loss, thus simplifying the apparatus.

Embodiments of the apparatus according to the invention for the purification of air will now be described by way of example with reference to the accompanying drawings in which:

FIGURES 4a and 4b show the complete apparatus comprising two columns alternately in utilisation (or adsorption) phase and in regeneration (or desorption) phase.

Figure 1:
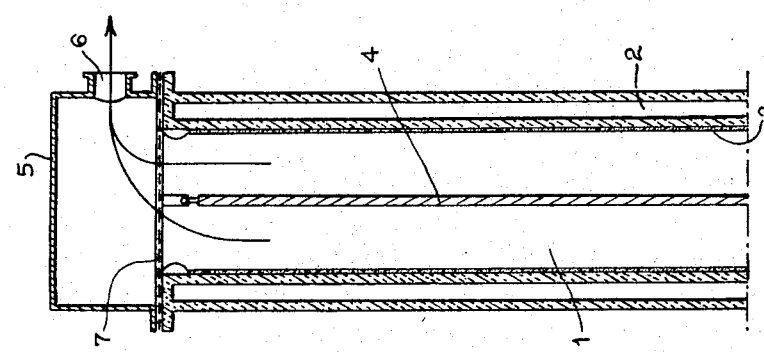
FIGURES 1 to 3 show in axial section three embodiments of a column of adsorbent intended to be heated by dielectric loss.

Referring to FIGURE 1, the adsorbent, consisting preferably of a Linde molecular sieve, is arranged in column 1 consisting of a container preferably of parallelepiped shape which allows easier working of the columns. The container may be constructed for example of insulating material, the wall being hollow so as to form a jacket 2 for the circulation of cooling water and having on its inner surface a layer of metallisation 3 grounded by means of a suitable connection, not shown. A metal plate 4 arranged in the axis of the container 1 is connected to one pole of a generator, not shown, producing a high alternating voltage of high frequency, for example between 1,500 and 4,000 volts. The column 1 is covered by a cover 5, for example of metal, provided with a discharge pipe 6 and separated from the column 1 by a grating 7 which prevents the adsorbent from being carried over by the current of gas.

Figure 2:
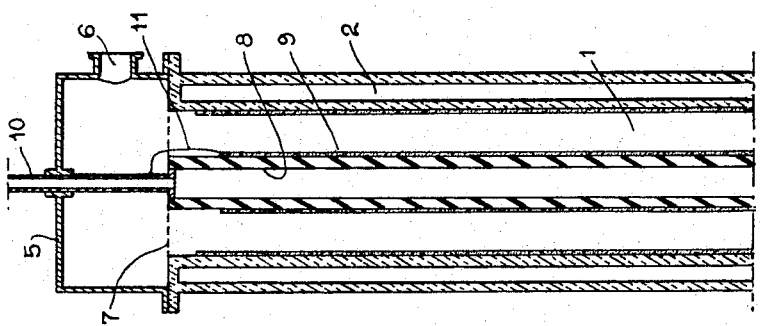

As regards the distribution of the electric field, the diameters of the two electrodes, namely the metallised inner wall 3 and the internal plate or rod 4 connected to the H.F. generator, are preferably in a ratio substantially equal to 2. Thus, according to the modification shown in FIGURE 2, the latter electrode consists of a tube of insulating material 8 having an outer layer 9 of metallisation. The metallised layers 3 and 9 stop short just below the upper ends of the column 1 and tube 8 which support the grating 7, as in the case of FIGURE 1. The central tube 8 can also be connected to the cooling water circulation system by means of a metal or externally metallised tube 10 extending through the cover 5. The tube 10 also serves as an electrical conductor connecting the metallised layer 9 of the tube 8 to the H.F. generator, the outer metallised surfaces of the tubes 8 and 10 being electrically connected by a simple connection 11.

Figure 3:
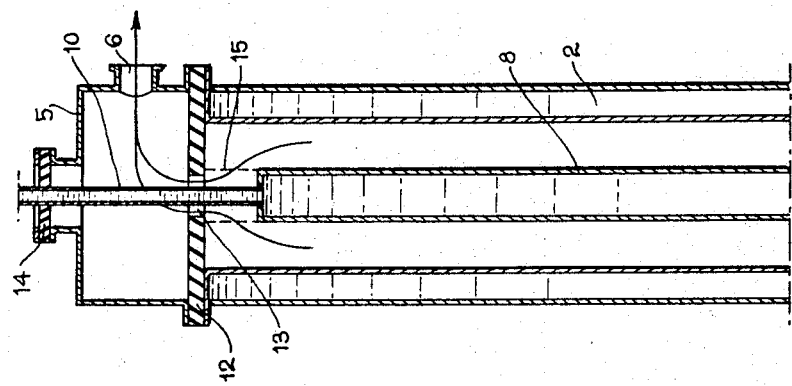

FIGURE 3 shows another embodiment in which the double walled container 2 and the central tube 8 are of metal. In this case the cover 5 which is also constructed of metal is separated from the container 2 by means of an insulating plate 12 having a central aperture 13 through which the treated air passes. The connecting tube 10 passes through an insulating joint 14 in the cover 5 and extends through an aperture 13 in the plate 12 to connect with the central tube 8, the height of which is less than that of the container 2 so as to allow the passage of air through the aperture 13. A cylindrical grating 15 is arranged between the top of the central tube 8 and the plate 12 to prevent adsorbent from being carried over.

Figure 4B:
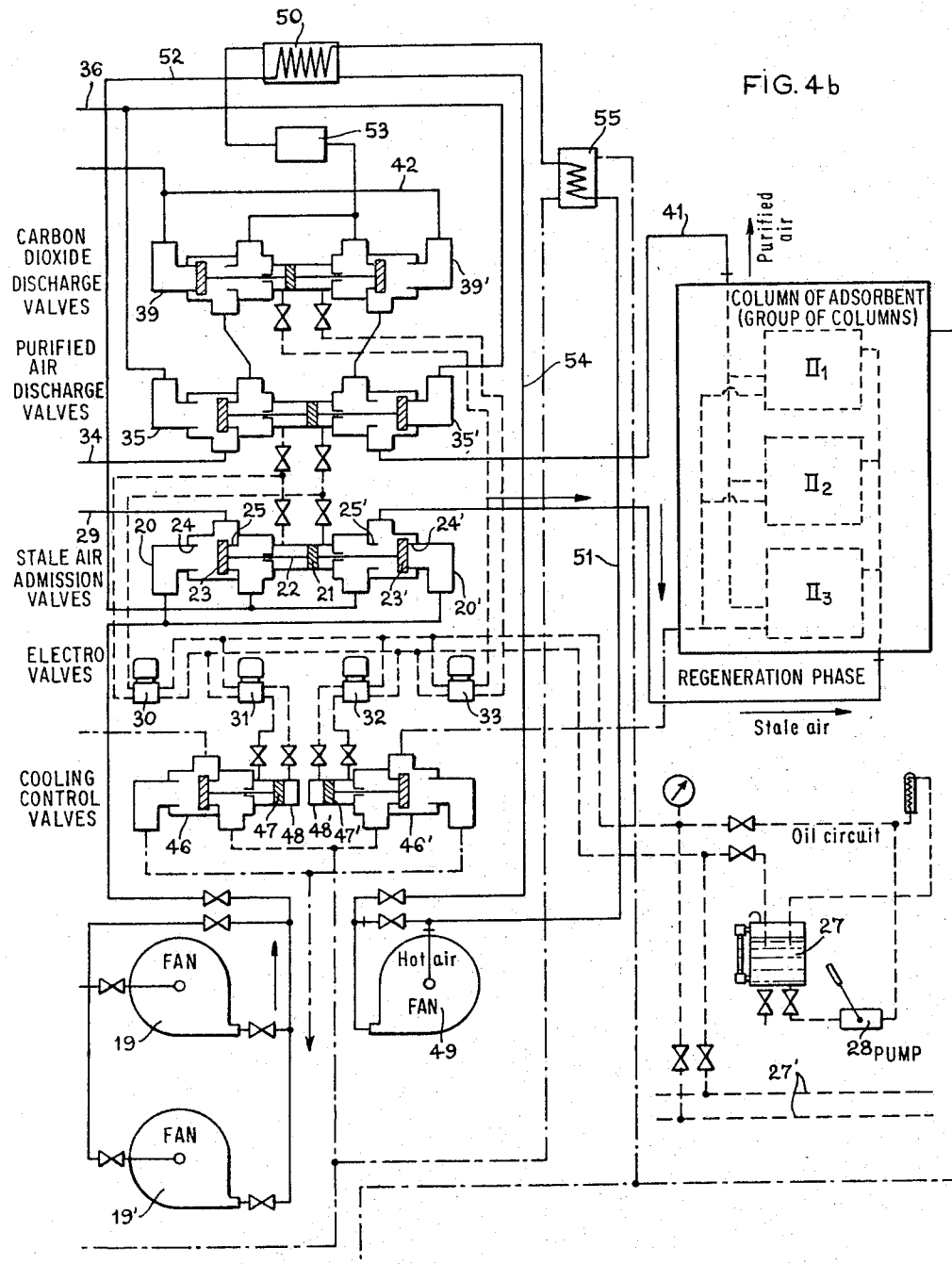

The complete apparatus for the regeneration of stale air comprising two columns of adsorbent I and II operating alternately is shown diagrammatically in FIGURES 4a and 4b. It is assumed that Column I is in the utilisation phase and Column II is in the regeneration phase. Columns I and II can be replaced by two groups each comprised of a plurality of columns, such as $I_1$, $I_2$, $I_3$ and $II_1$, $II_2$, $II_3$, the columns of each group being connected in parallel as shown in broken lines in FIGS. 4a and 4b.

The stale air is drawn through a dust removing and oil removing filter 17 to prevent choking of the adsorbent and through a cooler 18 into a collector 16 by one or other of two fans 19 and 19', which drive the air into one of the Columns I and II (into Column I in the case shown) through a double symmetrical valve assembly 20, 20', controlling the admission of stale air into the Column I or Column II according to the position of the control piston 21, the rod 22 of which carries two valves 23, 23' cooperating respectively with valve seats 24, 25 of the part 20 and valve seats 24', 25', of the part 20' of the valve assembly. The control piston 21 is actuated by oil under pressure supplied through a pipe 27' or coming from an auxiliary apparatus comprising a reservoir 27 subjected to pressure by a hand pump 28, the flow of oil under pressure shown in broken lines being controlled by electro-valves 30, 33 which control the double valve assemblies 20, 35 and 39 as will be described in greater detail below. In the position shown in the drawing, the valve assembly 20–20' shuts off stale air from the Column II by means of the valve 23' and admits stale air through the pipe 29 to the base of the Column I. The purified air leaves at the top of the Column I through the pipe 34 and passes through the double valve assembly 35–35', which is similar to the valve assembly 20–20' and is in the same position as the latter, and through the pipe 36 to the purified air collector 37. The cooler 18, for cooling the stale air entering the column of adsorbent in the utilisation phase, and the said column itself, are fed with cold water from cold water circulation system 38 through pipes indicated by mixed lines. The cooling circulation system is controlled by two valves 46, 46', each of which is constructed like one half of the double valve assembly 20 or 35. The valves 46 and 46' are controlled by the pistons 47, 47', of the cylinders 48, 48' to which oil under pressure is fed under control of the electro-valves 31 and 32 respectively.

While Column I is in the adsorption phase, Column II is in the desorption phase, that is to say it is subjected to heating by dielectric loss, or has a current of hot air passed through it.

During the dielectric heating, $CO_2$ leaving at the top of the column passes through the pipe 41 to the left hand part of the half valve 35', through which it passes into the right hand part of the half valve 39' which is in the opposite position to that of the valve assemblies 20–20' and 35–35'. From the right hand part of the half valve 39' the $CO_2$ passes through the pipe 42 to a cooler 40, then to a compressor 43–43', and from there to a mixer condensor 44 provided with a pump 45 for evacuating water containing dissolved $CO_2$. If the apparatus is to be fitted in a submarine, the condensor 44 may be fed with sea water.

During the hot air current phase, the parts of the valve assembly 39, 39' are in the same position as the corresponding parts of the valve assemblies 20 and 35. Air drawn from the bottom of Column II passes through the half valve 20', the pipe 52, a heat exchanger 50, a condenser 55 and pipe 51 to a fan 49, which sends it through a pipe 54 to a heat exchanger 50, a heater 53, and through the half valves 39' and 35' to return through a pipe 41 to the top of Column II. Water desorbed during the hot air current phase is removed by the condenser 55, which has automatic drainage.

What I claim is:

1. In an apparatus for purification of air, especially stale air, a container having an adsorbent therein comprising a molecular sieve for removing water vapor and carbon dioxide from air being purified and having at least on its inner surface a metal coating, an electrode disposed within the container, said container having an inlet for air at one end and an outlet for air at the other end, and means for heating the adsorbent by applying a high frequency voltage between said electrode and the container.

2. In an apparatus for purification of air, especially stale air, a container having an adsorbent therein comprising a molecular sieve for removing water vapor and carbon dioxide from air being purified and having at least on its inner surface a metal coating, an electrode disposed within the container, said container having an inlet for air at one end and an outlet for air at the other end, and means for applying a high frequency voltage between said electrode and the container containing adsorbent for heating said adsorbent, said container comprising a double walled container, electrode, and means for circulating cooling water through said electrode.

3. In an apparatus for purification of air, especially stale air, a double walled metallic container having an adsorbent therein comprising a molecular sieve for removing water vapor and carbon dioxide from air being purified therein, a central tubular metallic electrode disposed within the container, said container having an inlet for air at one end and an outlet for air at the other end, means for heating the adsorbent comprising means for applying a high frequency voltage between said electrode and the container, means for circulating cooling water through said electrode, said container having a base and an insulating cover, said cover having a central aperture, a tube of diameter less than that of said central aperture extending therethrough and connected to the central tubular electrode and a cylindrical grating provided to prevent adsorbent from being carried over by air currents and arranged at the upper end of said electrode terminating below said cover.

4. In an apparatus according to claim 3, comprising means connecting the tube passing through the aperture of the insulating cover to the high frequency current supply to a cooling water supply.

5. In an apparatus for purification of air, especially stale air, comprising a container having an adsorbent therein comprising a molecular sieve for removing water vapor and carbon dioxide from air being purified therein, a tubular electrode disposed within the container, said container having an inlet for air at one end and an outlet for air at the other end, means for heating the adsorbent comprising means for applying a high frequency voltage between said electrode and the container, the container and the central tubular electrode comprising insulating material and provided on opposite surfaces a metal coating terminated at a distance from the ends of the container and of the central electrode, gratings at both ends of the container to prevent adsorbent from being carried over by air currents passing through said container and said molecular sieve.

6. A plant for purification of air comprising, two containers, each container having an adsorbent therein comprising a molecular sieve for removing water vapor and carbon dioxide from air being purified and having at least on its inner surface a metal coating, each container having an electrode disposed within the container, each of said containers having an inlet for air at one end and an outlet for air at the other end, means for heating the adsorbent comprising means for applying a high frequency voltage between said electrode and the container, and means for alternately utilizing said containers in an adsorption phase and in regeneration comprising a desorption phase respectively.

7. A plant for purification of air comprising two containers, each container having an adsorbent therein comprising a molecular sieve for removing water vapor and carbon dioxide from air being purified and having at least on its inner surface a metal coating, each container having an electrode disposed within the container, each container having an inlet for air at one end and an outlet for air at the other end, and means for heating the adsorbent in each container comprising means for applying a high frequency voltage between said electrode and the container, and means for alternately utilizing said containers in an adsorption phase and in regeneration comprising a desorption phase respectively, means for passing hot air through each container of adsorbent for removal of moisture from the adsorbent during said regeneration.

8. A plant for purification of air comprising two containers, each container having an adsorbent therein comprising a molecular sieve for removing water vapor and carbon dioxide from air being purified and having at least on its inner surface a metal coating, each container having an electrode disposed within the container, each container having an inlet for air at one end and an outlet for air at the other end, and means for heating the adsorbent in each container comprising means for applying a high frequency voltage between said electrode of each container and the container means for alternately utilizing said containers in an adsorption phase and in regeneration comprising a desorption phase respectively, hydraulically controlled double valves to control the flow of stale air to the containers, the flow of purified air from said containers, and flow of hot air to the containers during the regeneration of the adsorbent comprising said desorption phase, each double valve comprising a single hydraulic cylinder and a double acting piston movable in said cylinder and provided with a rod, one half of a double valve being associated with one container and the other half of the same valve being associated with the other container.

9. Apparatus according to claim 8, wherein each of the two parts of each double valve is a three way valve.

10. A plant for the purification of air comprising two containers, each container having an adsorbent therein comprising a molecular sieve for removing water vapor and carbon dioxide from air being purified and having at least on its inner surface a metal coating, each container having an electrode disposed within the container, each container having an inlet for air at one end and an outlet for air at the other end, means for heating the adsorbent in each container comprising means for applying a high frequency voltage between said electrode and the respective container, means for alternately utilizing said containers in an adsorption phase and in regeneration comprising a desorption phase respectively, hydraulically controlled double valves to control the flow of stale air to the containers, the flow of purified air from said containers and flow of hot air to the containers during the regeneration of the adsorbent, each double valve comprising a single hydraulic cylinder and a double acting central piston, movable in said cylinder and provided with a rod, one half of a double valve being associated with one container and the other half of the same valve being associated with the other container, the three-way valves consisting of piston valves provided with rods integral with the rod of the central piston.

11. A plant according to claim 10, comprising cooler means for passing stale air therethrough before reaching the containers of adsorbent, and fan means for causing the flow of stale air.

12. A plant according to claim 10, comprising cooler means for passing stale air therethrough before reaching the containers of adsorbent, and fan means for causing the flow of stale air, the means for passing hot air through the containers for removal of moisture comprising means defining a closed circuit provided with an air heater, a heat exchanger for recovery of part of the heat given off by the hot air leaving the containers, and a condenser having automatic drainage means.

13. A plant according to claim 10, comprising cooler means for passing stale air therethrough before reaching the containers of adsorbent, and fan means for causing the flow of stale air, means for cooling the containers before and after the double wall of the containers, hydraulically operated valves for controlling the flow of water and similar hydraulic valves controlling the flow of air.

14. A plant for purification of air comprising two containers, each container having an adsorbent therein comprising a molecular sieve for removing water vapor and carbon dioxide from air being purified and having at least on its inner surface a metal coating, each container having an electrode disposed within the container, each container having an inlet for air at one end and an outlet for air at the other end, means for heating the absorbent in each container comprising means for applying a high frequency voltage between the said electrode and the respective container, means for alternately utilizing said containers in an adsorption phase and in regeneration comprising a desorption phase respectively, means for passing hot air through the containers of adsorbent for removal of moisture from the adsorbent during the regeneration phase, a cooler connected to the outlet of the containers to have the carbon dioxide discharged from the containers during regeneration of the adsorbent passed through said cooler, and a compressor connected to the outlet of said cooler.

15. A plant for purification of air comprising two containers, each container having an adsorbent therein comprising a molecular sieve for removing water vapor and carbon dioxide from air being purified and having at least on its inner surface a metal coating, each container having an electrode disposed within the container, each container having an inlet for air at one end and an outlet for air at the other end, and means for heating the adsorbent in each container comprising means for applying a high frequency voltage between said electrode and the container, means for alternately utilizing said containers in an adsorption phase and in regeneration comprising a desorption phase respectively, hydraulically controlled double valves to control the flow of stale air to the containers of adsorbent, the flow of purified air from said containers, and the flow of hot air to the containers during the regeneration of the adsorbent, each double valve comprising a single hydraulic cylinder and a double acting piston movable in said cylinder and provided with a rod, one half of a double valve being associated with one container and the other half of the same valve being associated with the other container, and electro-valves provided to control the supply of fluid under pressure to the hydraulically controlled double valves.

16. Apparatus according to claim 15, comprising a controller automatically controlling the whole series of operations, including heating, cooling and passing a current of hot air through the containers, according to a programme designating the alternate phases of adsorption and regeneration.

17. A plant according to claim 15, comprising two groups of containers and means for alternately utilizing said groups of containers in an adsorption phase and in a regeneration phase respectively.

18. In a process for purification of air, especially stale air, passing the air to be purified through a container having a metal coating, an electrode within said container and an adsorbent about said electrode capable of taking up the impurities such as carbon dioxide and water vapours and comprising a zeolite molecular sieve comprising double silicate of aluminum and sodium, subjecting said molecular sieve to the action of an electric field of high frequency including passing current between said electrode and coating thereby to regenerate said molecular sieve.

19. A process for purification of air, especially stale air comprising, passing the air to be purified through a container having a metal coating, an electrode within said container and an adsorbent about said electrode capable of taking up the impurities such as carbon dioxide and water vapour, and comprising a zeolite molecular sieve comprising double silicate of aluminum and sodium, and regenerating the adsorbing molecular sieve by subjecting said molecular sieve to the action of an electric field of high frequency including passing current between said electrode and coating and controlling the heat developed in said molecular sieve due to the dielectric losses for raising the temperature thereof to a value of about 150° to 200° C.

20. A process for purification of air, especially stale air comprising passing the air to be purified through a container having a metal coating, an electrode within said container and an adsorbent about said electrode capable of taking up the impurities including carbon dioxide and water vapour, and comprising a zeolite molecular sieve comprising double silicate of aluminum and sodium, regenerating the adsorbing molecular sieve comprising the step of subjecting said molecular sieve to the action of an electric field of high frequency including passing current between said electrode and coating, and passing a current of hot air through the adsorbent to remove residual moisture therefrom.

21. A method of treating air for removing carbon dioxide and moisture therefrom comprising, providing a molecular sieve capable of adsorbing moisture and carbon dioxide, passing the air to be treated through said sieve to remove therefrom moisture and carbon dioxide, subjecting said molecular sieve to a high frequency field driving off carbon dioxide and moisture adsorbed.

22. A method of treating air for removing carbon dioxide and moisture therefrom according to claim 21, including subjecting said molecular sieve to heated air to drive residual moisture therefrom.

References Cited

UNITED STATES PATENTS

| | | | |
|---|---|---|---|
| 658,915 | 10/1900 | Jacobsen | 137—596.18 |
| 1,887,589 | 11/1932 | Farmer | 55—63 |
| 1,924,849 | 8/1933 | Fonda | 55—162 |
| 2,278,854 | 4/1942 | Hunsicker | 55—161 |
| 2,494,644 | 1/1950 | Clement | 55—33 |
| 2,783,547 | 3/1957 | Bieger et al. | 55—162 |
| 3,211,584 | 10/1965 | Ehrreich | 117—227 |
| 3,221,477 | 12/1965 | Arnoldi et al. | 55—31 |

REUBEN FRIEDMAN, *Primary Examiner.*

C. N. HART, *Assistant Examiner.*